(12) United States Patent
Ishiguro et al.

(10) Patent No.: US 11,300,178 B2
(45) Date of Patent: Apr. 12, 2022

(54) FRICTION DRIVE BELT

(71) Applicant: Mitsuboshi Belting Ltd., Kobe (JP)

(72) Inventors: Hisato Ishiguro, Hyogo (JP); Yoshihiro Miura, Hyogo (JP)

(73) Assignee: Mitsuboshi Belting Ltd., Kobe (JP)

( * ) Notice: Subject to any disclaimer, the term of this patent is extended or adjusted under 35 U.S.C. 154(b) by 398 days.

(21) Appl. No.: 16/064,191

(22) PCT Filed: Dec. 20, 2016

(86) PCT No.: PCT/JP2016/087895
§ 371 (c)(1),
(2) Date: Jun. 20, 2018

(87) PCT Pub. No.: WO2017/110784
PCT Pub. Date: Jun. 29, 2017

(65) Prior Publication Data
US 2019/0003555 A1    Jan. 3, 2019

(30) Foreign Application Priority Data

Dec. 21, 2015  (JP) .............................. JP2015-249033
Dec. 12, 2016  (JP) ................................. 2016-240727

(51) Int. Cl.
*F16G 5/06*      (2006.01)
*C08K 3/04*     (2006.01)
(Continued)

(52) U.S. Cl.
CPC ................. *F16G 5/06* (2013.01); *C08K 3/04* (2013.01); *C08K 3/36* (2013.01); *C08K 7/02* (2013.01);
(Continued)

(58) Field of Classification Search
CPC ....................................................... F16G 5/06
(Continued)

(56) References Cited

U.S. PATENT DOCUMENTS 4,869,711 A * 9/1989 Komai ...................... F16G 5/06
                                                            474/263
5,244,436 A    9/1993 Kurokawa
(Continued)

FOREIGN PATENT DOCUMENTS

EP    0470836 A1    2/1992
EP    2711587 A1    3/2014
(Continued)

OTHER PUBLICATIONS

Aug. 29, 2018—(JP) Information Offer Form and Notification—App 2016-240727, Eng Tran.
(Continued)

*Primary Examiner* — Michael R Mansen
*Assistant Examiner* — Mark K Buse
(74) *Attorney, Agent, or Firm* — Banner & Witcoff, Ltd.

(57) ABSTRACT

The present invention pertains to a frictional power transmission belt including a tension member extending in the longitudinal direction of the belt and an adhesion rubber layer in contact with at least a portion of the tension member, in which the adhesion rubber layer is formed of a vulcanized rubber composition containing a rubber component, short fibers having an average fiber diameter of 2 μm or more, and a filler.

6 Claims, 5 Drawing Sheets

(51) Int. Cl.
| | |
|---|---|
| *C08K 3/36* | (2006.01) |
| *C08L 11/00* | (2006.01) |
| *C08K 7/02* | (2006.01) |
| *F16G 5/08* | (2006.01) |
| *F16G 5/20* | (2006.01) |
| *C08L 9/00* | (2006.01) |
| *C08L 61/12* | (2006.01) |
| *C08L 79/08* | (2006.01) |
| *C08L 61/28* | (2006.01) |
| *C08F 36/18* | (2006.01) |
| *C08L 77/10* | (2006.01) |

(52) U.S. Cl.
CPC ............... *C08L 9/00* (2013.01); *C08L 11/00* (2013.01); *F16G 5/08* (2013.01); *F16G 5/20* (2013.01); *C08F 36/18* (2013.01); *C08L 61/12* (2013.01); *C08L 61/28* (2013.01); *C08L 77/10* (2013.01); *C08L 79/085* (2013.01); *C08L 2203/12* (2013.01); *C08L 2205/16* (2013.01)

(58) Field of Classification Search
USPC .......................................................... 474/263
See application file for complete search history.

(56) References Cited

U.S. PATENT DOCUMENTS

| | | | | |
|---|---|---|---|---|
| 6,491,598 | B1* | 12/2002 | Rosenboom | B32B 25/14 474/260 |
| 6,506,495 | B1* | 1/2003 | Enami | B32B 5/18 428/420 |
| 7,485,060 | B2* | 2/2009 | Hineno | C08L 21/00 428/295.1 |
| 8,147,365 | B2* | 4/2012 | Matsuda | F16G 1/28 474/260 |
| 9,255,201 | B2* | 2/2016 | Feng | C08L 97/02 |
| 2003/0027920 | A1* | 2/2003 | Kinoshita | F16G 5/06 524/508 |
| 2004/0005447 | A1* | 1/2004 | Takehara | F16G 1/08 428/292.1 |
| 2007/0249451 | A1* | 10/2007 | Wu | F16G 5/20 474/263 |
| 2009/0029818 | A1* | 1/2009 | Takahashi | F16G 1/08 474/263 |
| 2009/0149289 | A1* | 6/2009 | Cheong | F16G 5/06 474/263 |
| 2009/0298633 | A1* | 12/2009 | Hineno | F16G 5/20 474/263 |
| 2010/0203994 | A1* | 8/2010 | Fujikawa | C08K 3/04 474/263 |
| 2011/0218069 | A1* | 9/2011 | Nakashima | F16G 5/20 474/260 |
| 2012/0165145 | A1 | 6/2012 | Kitano et al. | |
| 2014/0066244 | A1 | 3/2014 | Furukawa et al. | |
| 2014/0364260 | A1* | 12/2014 | Takahashi | C08L 23/16 474/263 |
| 2014/0378256 | A1* | 12/2014 | Tamura | F16G 5/08 474/265 |
| 2015/0111677 | A1* | 4/2015 | Nishiyama | C08K 5/20 474/264 |
| 2015/0285335 | A1* | 10/2015 | Mitsutomi | B29D 29/08 474/238 |
| 2015/0369335 | A1* | 12/2015 | Ishiguro | C08K 7/02 474/260 |
| 2016/0040749 | A1* | 2/2016 | Kageyama | B32B 3/30 474/8 |
| 2016/0298725 | A1* | 10/2016 | Ishiguro | F16G 1/10 |
| 2019/0003555 | A1* | 1/2019 | Ishiguro | C08L 11/00 |

FOREIGN PATENT DOCUMENTS

| | | |
|---|---|---|
| JP | H04-42944 U | 4/1992 |
| JP | H10-238596 A | 9/1998 |
| JP | 2000-320617 A | 11/2000 |
| JP | 2008-261473 A | 10/2008 |
| JP | 2009-249519 A | 10/2009 |
| JP | 2009249519 A * | 10/2009 |
| JP | 2012-177068 A | 9/2012 |
| JP | 2012-215212 A | 11/2012 |
| JP | 2012-241831 A | 12/2012 |
| JP | 2013-024349 A | 2/2013 |
| JP | 2013-242034 A | 12/2013 |
| JP | 2014-209029 A | 11/2014 |
| JP | 2015-152101 A | 8/2015 |
| WO | 2011-027380 A1 | 3/2011 |
| WO | 2014/157594 A1 | 10/2014 |
| WO | 2014/208628 A1 | 12/2014 |
| WO | 2015/080157 A1 | 6/2015 |

OTHER PUBLICATIONS

Apr. 6, 2020—(EP)) Notice of Third Party Observations Against EP App. No. 16 878 673.9 (ER 3 396 201).
Aug. 9, 2019—(EP) Extended Search Report—App 16878673.9.
May 8, 2018—(JP) Notification of Reasons for Refusal—App 2016-240727—Eng Tran.
Mar. 14, 2017—International Search Report—Intl App PCT/JP2016/087895.
Oct. 1, 2019—(JP) Notification of Reasons for Refusal—JP App 2016-240727, Eng Tran.
Nov. 2, 20187—(JP) Decision of Refusal—App 2016-240727, Eng Tran.

* cited by examiner

FRICTION DRIVE BELT

CROSS REFERENCE TO RELATED APPLICATIONS

This is a U.S. National Phase Application under 35 U.S.C. § 371 of International Application No. PCT/JP2016/087895, filed Dec. 20, 2016, which claims priority to Japanese Application Nos. 2015-249033 filed Dec. 21, 2015 and 2016-240727 filed Dec. 12, 2016, which was published Under PCT Article 21(2), the entire contents of which are incorporated herein by reference.

TECHNICAL FIELD

The present invention relates to a frictional power transmission belt in which a frictional power transmission surface is formed to be inclined in V-shape, such as a V-belt and a V-ribbed belt, and in particular to a frictional power transmission belt capable of improving a lateral pressure resistance received from a pulley.

BACKGROUND ART

Conventionally, a frictional power transmission belt such as a V-belt, a V-ribbed belt, and a flat belt has been known as a power transmission belt that transmits power. The V-belt or V-ribbed belt in which a frictional power transmission surface (V-shaped side surface) is formed of a V-angle is wound with tension applied between a drive pulley and a driven pulley, and rotates between two axes in a state where the V-shaped side surface is in contact with a V-groove of pulleys. In this process, power is transmitted by utilizing an energy accompanying a friction generated by a thrust between the V-shaped side surface and the V-groove of the pulley. In these frictional power transmission belts, a tension member (cord) is buried in a rubber body (between compression rubber layer and tension rubber layer) along a longitudinal direction of the belt, and this tension member (cord) plays a role that transmits the power from the drive pulley to the driven pulley. In addition, an adhesion rubber layer is generally provided in order to enhance adhesiveness between the tension member (cord) and rubber.

The V-belt includes a raw-edge type (raw-edge V-belt) in which the frictional power transmission surface (V-shaped side surface) is an exposed rubber layer, and a wrapped type (wrapped V-belt) in which the frictional power transmission surface (V-shaped side surface) is covered with a cover fabric, and they are properly used depending on an application from a difference in surface properties (friction coefficients of rubber layer and of cover fabric) of the frictional power transmission surface. In addition, the raw-edge type belt includes a raw-edge cogged V-belt in which flexibility is improved by providing cogs only on a lower surface (inner peripheral surface) of the belt or both the lower surface (inner peripheral surface) and an upper surface (outer peripheral surface) of the belt.

The raw-edge V-belt and the raw-edge cogged V-belt are mainly used for driving of general industrial machinery and agricultural machinery, for auxiliary driving in automobile engines, and the like. In addition, there is a raw-edge cogged V-belt called a variable speed belt used for a belt type continuously variable transmission device of a motorcycle or the like, as another application.

Figure 1:
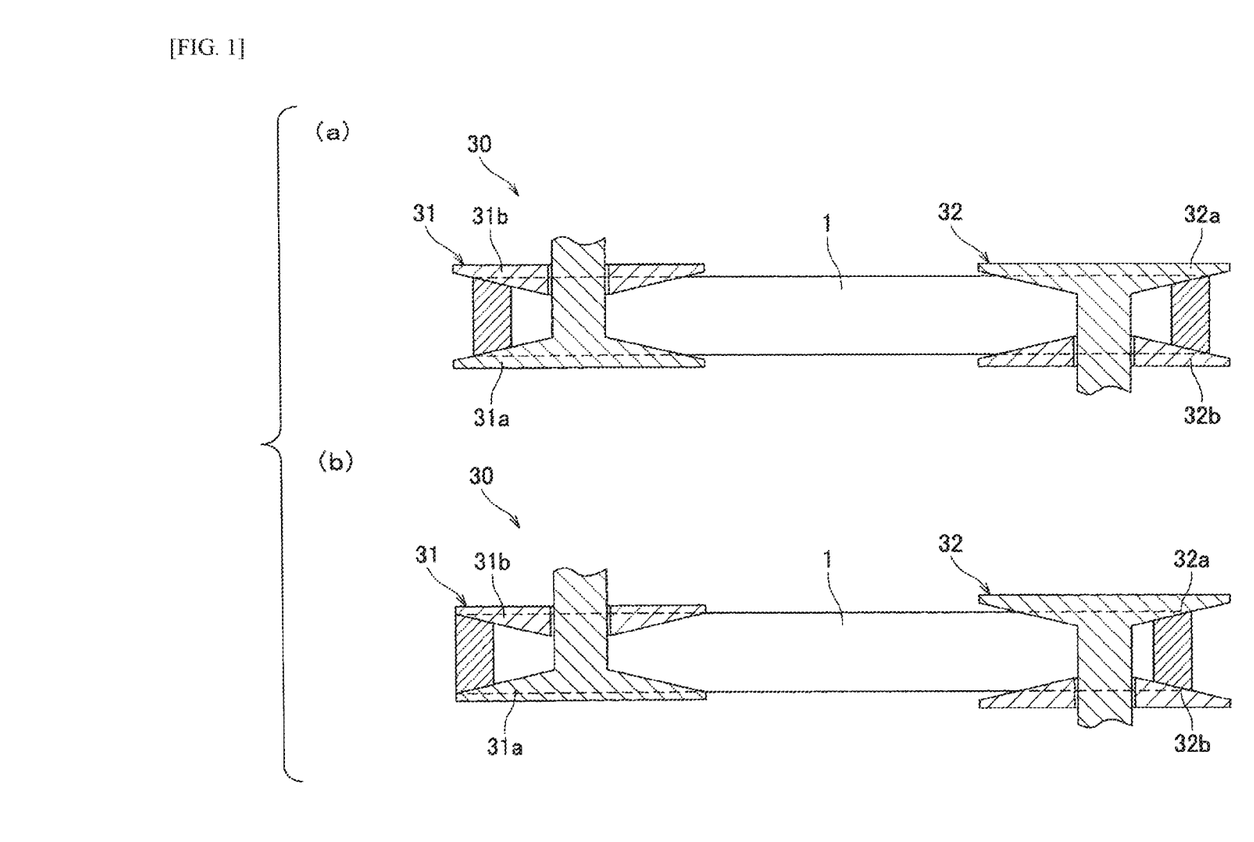
FIG. 1 is a schematic view for explaining a transmission mechanism of a belt type continuously variable transmission device.

As illustrated in FIG. 1, a belt type continuously variable transmission device 30 is a device that steplessly changes a gear ratio by winding a frictional power transmission belt 1 around a drive pulley 31 and a driven pulley 32. Each pulley 31 and 32 includes stationary pulley pieces 31a and 32a fixed in the axial direction and movable pulley pieces 31b and 32b movable in the axial direction, and has a structure that can continuously change the width of the V-groove of the pulleys 31 and 32 formed of these stationary pulley pieces 31a and 32a and movable pulley pieces 31b and 32b. In the power transmission belt 1, both end surfaces in the width direction are formed as tapered surfaces of which inclines match with facing surfaces of the V-grooves of each pulley 31 and 32, and fit into any positions in the vertical direction on the facing surface of the V-grooves according to the width of the changed V-grooves. For example, when a state illustrated in (a) of FIG. 1 is changed to a state illustrated in (b) of FIG. 1 by reducing the width of the V-groove of the drive pulley 31 and increasing the width of the V-groove of the driven pulley 32, the power transmission belt 1 moves upward the V-groove on the drive pulley 31 side and downward the V-groove on the driven pulley 32 side, a winding radius to the pulleys 31 and 32 continuously changes and the gear ratio can be steplessly changed. The variable speed belt used for such an application is used with a harsh layout at a high load as well as the belt being significantly bent. That is, specific design has been made to withstand not only a winding rotation between two axes of the drive pulley and the driven pulley but also harsh movements in high load environments such as a movement in the radial direction of the pulley, and a repeated bending motion due to a continuous change of the winding radius.

Therefore, one of important factors responsible for durability of the frictional power transmission belt such as a variable speed belt is the lateral pressure resistance received from the pulley. Conventionally, as a formulation to improve the lateral pressure resistance, a rubber composition having a large mechanical characteristic reinforced by compounding short fibers or the like is used for the compression rubber layer and the tension rubber layer. On the other hand, a rubber composition having a relatively low mechanical characteristic is used as an adhesive rubber because a bending fatigue resistance decreases when the mechanical characteristic is excessively increased.

For example, PTL 1 discloses a power transmission V-belt in which a rubber hardness of at least one of the tension and compression rubber layers is set to be in a range of 90° to 96°, a rubber hardness of the adhesion rubber layer is set to be in a range of 83° to 89°, and aramid short fibers are made to orient in the width direction of the belt in the tension and compression rubber layers. In this literature, occurrence of cracks and separations (peelings) of each rubber layer and cord at an early stage are prevented and a lateral pressure resistance is improved so that high load transmission capability is improved.

However, from a viewpoint of compounding design of such a rubber composition, the following problems (1) to (4) which are caused by running of the belt in a high load environment and are factors for a decrease in durability (life) are concerned.

(1) In the case where adhesiveness between a cord and an adhesive rubber is low, peeling occurs between the cord and the adhesive rubber.

(2) In the case where the friction coefficient of a contact surface (power transmission surface) with the pulley is high, the belt does not smoothly move, so that the belt is easily deformed (in particular, buckling called dishing).

(3) As the belt moves in the radial direction of the pulley or deforms (buckles), a shear stress occurs inside the belt, in particular, the shear stress is likely to concentrate on the interfaces where there are differences in mechanical characteristic (in this case, interface between compression rubber or tension rubber and adhesion rubber), and interfacial peeling (cracks) occurs.

(4) The contact surface (power transmission surface) with the pulley is abraded by sliding with the pulley.

Furthermore, in recent years, in addition to durability (lateral pressure resistance), it is required to improve fuel saving performance, and therefore it is necessary to improve power transmission efficiency (reduce power transmission loss) to improve fuel efficiency. However, the lateral pressure resistance and fuel saving performance of the power transmission belt are in an antinomic relationship. For example, it has been known that in the case where the compression rubber layer of the V-belt is blended with a reinforcing material such as a short fiber, carbon black, and silica so as to increase the rubber hardness to improve the lateral pressure resistance, the bending rigidity is increased and thus, the power transmission loss occurs especially in a layout of a small pulley diameter.

Specifically, in the variable speed belt used for a belt type continuously variable transmission device of a motorcycle or the like, it is a big problem to achieve both the lateral pressure resistance and the fuel saving performance, and for example, PTL 2 discloses a power transmission belt provided with a compression rubber layer containing a fatty acid amide and a short fiber. In addition, PTL 3 discloses a power transmission V-belt in which short fibers are buried in a compression rubber layer and tension rubber layer so as to be oriented in the width direction, and the short fibers protrude at least on the side surface of the tension rubber layer. Furthermore, PTL 4 discloses a double cogged V-belt in which a lower cog forming portion and an upper cog forming portion are formed of a rubber composition having specific dynamic viscoelasticity by containing 40 to 80 parts by weight of filler based on 100 parts by weight of rubber in which the filler contains 30% or more of silica. That is, in these literatures, various techniques for achieving both the lateral pressure resistance and the fuel saving performance have been disclosed.

Factors that influence the power transmission efficiency include (1) flexibility in the circumferential direction of the belt, (2) rigidity in the width direction of the belt (lateral pressure resistance), and (3) friction coefficient of the frictional power transmission surface. The power transmission efficiency can be enhanced (power transmission loss can be reduced) by means of (1) increasing the flexibility in the circumferential direction of the belt (reducing bending rigidity to cause it easier to bend), (2) increasing the rigidity in the width direction of the belt (lateral pressure resistance), and (3) reducing the friction coefficient of the frictional power transmission surface (lowering frictional force of frictional power transmission surface to make sliding with pulley smooth), respectively. In PTLs 2 to 4, means to balance the durability and speed change characteristics (acceleration performance) while improving the power transmission efficiency have been proposed with the design concepts focusing on any one of the factors (1) to (3).

In this manner, in general, a rubber composition in which mechanical characteristics are improved by reinforcing with carbon black, short fiber or the like and the friction coefficient of the frictional power transmission surface is reduced by making the short fibers protruded thereon, is used for the compression rubber layer and the tension rubber layer. On the other hand, for the reinforcement of the adhesion rubber layer, carbon black or silica is used so as not to decrease adhesiveness and bending fatigue resistance, and it is considered preferable not to blend short fibers. Accordingly, a rubber composition having a relatively low mechanical characteristic and high friction coefficient has been used for the adhesion rubber layer.

For example, PTL 5 discloses a frictional power transmission belt provided with an adhesion rubber layer formed of a vulcanized rubber composition containing 0.3 to 10 parts by mass of a fatty acid amide and 1 to 30 parts by mass of silica based on 100 parts by mass of a rubber component such as chloroprene rubber. In addition, PTL 6 discloses a power transmission belt formed of an organic peroxide-crosslinked material of a rubber composition containing 20 to 70 parts by mass of silica and 1 to 10 parts by mass of carbon black based on 100 parts by mass of a rubber component containing an ethylene-α-olefin elastomer. Furthermore, PTL 7 discloses a power transmission belt provided with an adhesion rubber layer formed of a vulcanized rubber composition containing an ethylene-α-olefin-diene copolymer, silica, a silane coupling agent, and a filler such as carbon black.

However, since the adhesion rubber layer of PTLs 1 to 7 is reinforced only with silica or carbon black, there was a possibility that the friction coefficient of the adhesion rubber layer is larger than that of the compression rubber layer, the sliding property of the frictional power transmission surface is decreased, and the belt may not move smoothly on the pulley. Specifically, in a high load environment such as a variable speed belt and in running accompanying movement in the radial direction of the pulley, the belt deforms and the shear stress occurs inside the belt, and thus, the shear stress is likely to concentrate on the interface of the layers different in mechanical characteristic [in this case, interface between the compression rubber layer (or tension rubber layer) and the adhesion rubber], and there is a possibility that the interfacial peeling (cracks) occurs. That is, even with the belts of these literatures, it cannot be said that both the lateral pressure resistance and the fuel saving performance are achieved at a high level.

On the other hand, PTL 8 discloses that an adhesive rubber portion of a frictional power transmission belt is formed of a vulcanized rubber composition containing two types of elastomer having different viscosities including at least one type selected from the group consisting of an ethylene-propylene copolymer and an ethylene-propylene-diene terpolymer, and a modified nylon microfiber, in a frictional power transmission belt such as a V-ribbed belt used under a high tension and high load environment, in order to suppress cord separation while improving the modulus and tear resistance performance of the adhesive rubber portion and to improve the kneadability of the rubber composition. The modified nylon microfiber is a fiber-containing elastomer in which a nylon fiber is bonded to a matrix formed of a polyolefin, an elastomer, and a spherical silica having an average particle size of 1 μm or less and a water content of 1,000 ppm or less. As the nylon fiber, an ultrafine nylon fiber formed of 6-nylon, 6,6-nylon, 6,10-nylon or the like and having a fiber length of approximately 4,000 μm or less (preferably approximately 1,000 μm or less), and a fiber diameter of approximately 1.5 μm or less (preferably approximately 1.0 μm or less) is described. Details of the nylon fiber in Examples are unknown. In Examples of this literature, 60 to 67 parts by weight of large particle size silica and 3 parts by weight of carbon black are blended based on 100 parts by weight of the elastomer.

However, the belt of PTL 8 is supposed to be applied for driving auxiliary machinery (V-ribbed belt), and the purpose of reducing the friction coefficient of the adhesion rubber layer (achievement both fuel saving performance and durability) is not described. Furthermore, even when the belt of this literature is applied to the variable speed belt, both the lateral pressure resistance and the fuel saving performance cannot be achieved at a high level. That is, the lateral pressure resistance and fuel saving performance are in the antinomic relationship, and it has been difficult to satisfy both of them (both bending rigidity and sliding property) conventionally.

CITATION LIST

Patent Literature

[PTL 1] JP-A H10-238596
[PTL 2] JP-A 2012-241831
[PTL 3] JP-A 2013-24349
[PTL 4] JP-A 2015-152101
[PTL 5] JP-A 2013-242034
[PTL 6] JP-A 2008-261473
[PTL 7] JP-A 2012-177068
[PTL 8] JP-A 2012-215212

SUMMARY OF INVENTION

Technical Problem

An object of the present invention is to provide a frictional power transmission belt which can improve lateral pressure resistance while maintaining fuel saving performance.

Another object of the present invention is to provide a frictional power transmission belt which can improve power transmission efficiency under high load conditions even when applied to a variable speed belt and can suppress peeling between layers or peeling of cords even when used over a long period of time.

Solution to Problem

As a result of intensive studies to achieve the above object, the present inventors found that by forming an adhesion rubber layer of a frictional power transmission belt with a vulcanized rubber composition containing a rubber component, short fibers having an average fiber diameter of 2 μm or more and a filler, lateral pressure resistance can be improved while maintaining fuel saving performance, and completed the present invention.

That is, a frictional power transmission belt according to the present invention is a frictional power transmission belt including a tension member extending in a longitudinal direction of a belt, and an adhesion rubber layer in contact with at least a portion of the tension member, in which the adhesion rubber layer is formed of a vulcanized rubber composition containing a rubber component, short fibers having an average fiber diameter of 2 μm or more, and a filler. The rubber component may contain chloroprene rubber. The average fiber diameter of the short fibers may be approximately 5 to 50 μm. The short fibers may have an average fiber length of approximately 1.5 to 20 mm. The short fibers may contain an aramid fiber. The proportion of the short fibers may be approximately 0.1 to 15 parts by mass based on 100 parts by mass of the rubber component. The filler may contain silica. The filler may further contain carbon black. A proportion of the carbon black may be approximately 10 to 150 parts by mass based on 100 parts by mass of silica. A proportion of the filler may be approximately 30 to 100 parts by mass based on 100 parts by mass of the rubber component. The adhesion rubber layer may be formed of the vulcanized rubber composition having a ratio (compression stress/bending stress ratio) of compression stress to bending stress of 0.6 to 0.8. The frictional power transmission belt of the present invention may be a raw-edge cogged V-belt (variable speed belt used particularly for a continuously variable transmission device).

Advantageous Effects of Invention

In the present invention, since the adhesion rubber layer of the frictional power transmission belt is formed of the vulcanized rubber composition containing a rubber component, short fibers having an average fiber diameter of 2 μm or more, and a filler, fuel saving performance (power transmission efficiency) and lateral pressure resistance (durability) can be improved.

Specifically, by combining a specific short fiber and a large amount of filler, the friction coefficient of the adhesion rubber layer can be reduced to the same level as that of the compression rubber layer (or tension rubber layer) without decreasing the adhesiveness and bending fatigue resistance, and peeling (cracking) at the interface of the layers at the time of running can be suppressed by decreasing the difference between mechanical characteristics of both. As a result, a belt good in durability can be obtained. In addition, as the friction coefficient decreases, slidability is improved and the power transmission efficiency is also improved (fuel saving performance).

Furthermore, in the case where the silica and the carbon black are combined at a specific ratio as the filler, in addition to ensuring adhesiveness due to the silica (on the other hand, abrasion resistance decreases), the abrasion resistance can be compensated by the carbon black blended in a proportion that does not affect bending fatigue resistance. Furthermore, in the case where the proportion of short fibers is adjusted to decrease the friction coefficient to the extent that it does not affect the adhesiveness, an adhesion rubber layer having the adhesiveness, the bending fatigue resistance, the abrasion resistance and a low friction coefficient can be obtained by balancing the blending amount of these three components.

Therefore, the power transmission efficiency can be improved under high load conditions even when applied to the variable speed belt, and peeling between layers or peeling of cords can be suppressed even when used over a long period of time.

DESCRIPTION OF EMBODIMENTS

[Structure of Frictional Power Transmission Belt]

A frictional power transmission belt of the present invention only have to contain a tension member extending in the longitudinal direction of a belt and an adhesion rubber layer in contact with at least a portion of the tension member, in which the adhesion rubber layer is formed of a vulcanized rubber composition containing a rubber component, short fibers having an average fiber diameter of 2 μm or more, and a filler, but normally may be provided with a compression rubber layer formed on one surface of the adhesion rubber layer and an tension rubber layer formed on the other surface of the adhesion rubber layer.

Examples of the frictional power transmission belt of the present invention include a V-belt [wrapped V-belt, raw-edge V-belt, and raw-edge cogged V-belt (raw-edge cogged V-belt with cog formed on the inner peripheral side of the raw-edge belt, and raw-edge double cogged V-belt in which cogs are formed on both the inner peripheral side and the outer peripheral side of the raw-edge belt)], a V-ribbed belt, a flat belt, and the like. Among these frictional power transmission belts, the V-belt or the V-ribbed belt in which a frictional power transmission surface is formed to be inclined in a V-shape (at V-angle) is preferable from the viewpoint of receiving a large lateral pressure from a pulley. The raw-edge cogged V-belt is particularly preferable from the viewpoint of being used for a belt type continuously variable transmission device that requires high achievement both a lateral pressure resistance and fuel saving performance.

Figure 2:
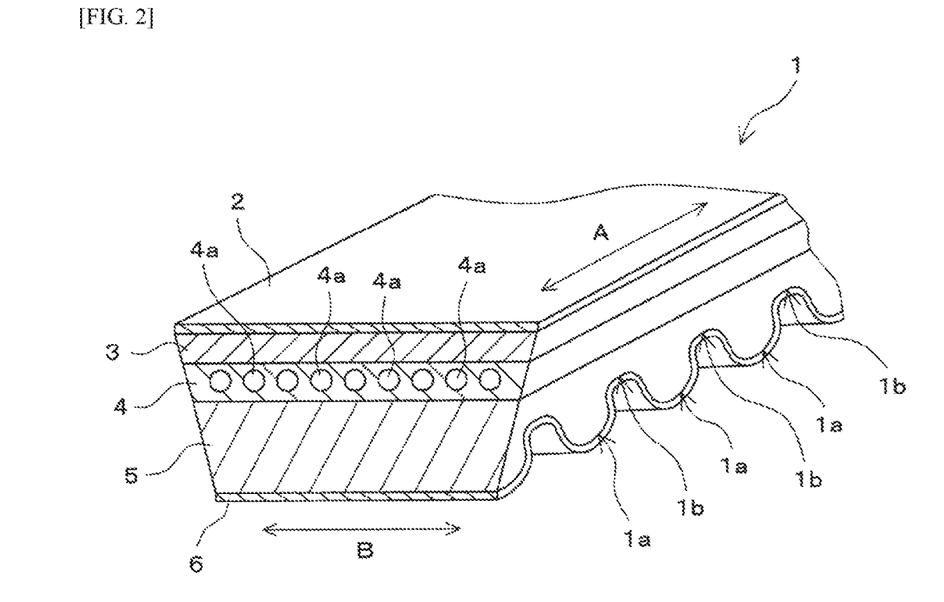
FIG. 2 is a schematic perspective view illustrating an example of a frictional power transmission belt of the present invention.
Figure 3:
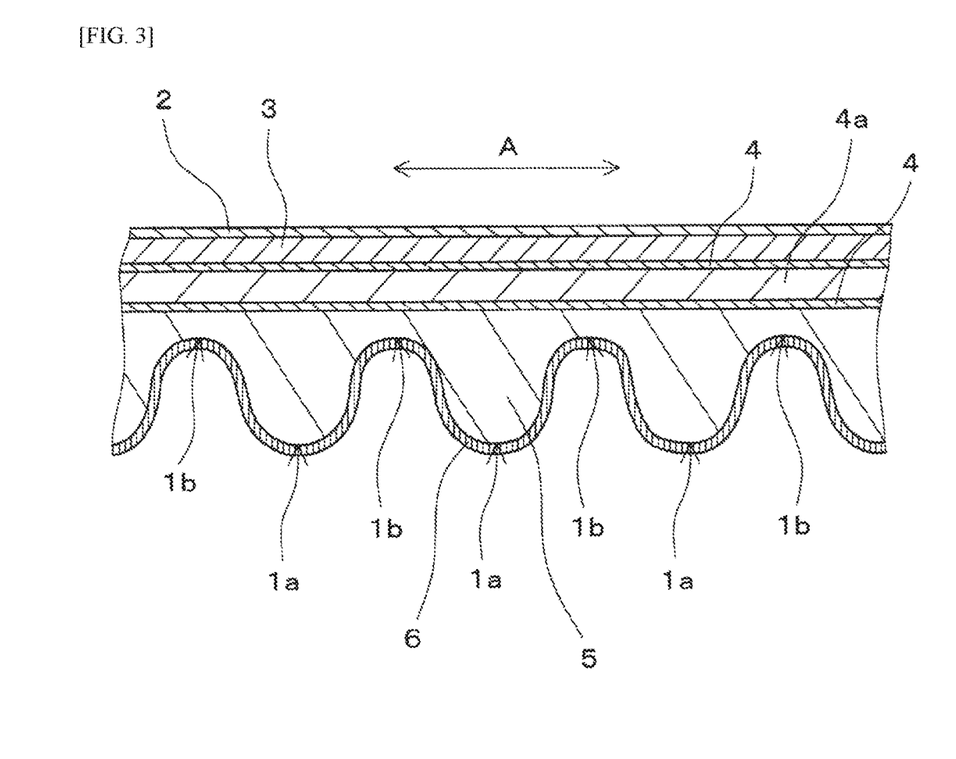
FIG. 3 is a schematic cross-sectional view of the frictional power transmission belt of FIG. 2 cut in a longitudinal direction of a belt.

FIG. 2 is a schematic perspective view illustrating an example of the frictional power transmission belt (raw-edge cogged V-belt) of the present invention. FIG. 3 is a schematic cross-sectional view of the frictional power transmission belt of FIG. 2 cut in the longitudinal direction of the belt.

In this example, a frictional power transmission belt 1 has a plurality of cog portions 1a formed on the inner circumferential surface of a belt main body at predetermined intervals along the longitudinal direction (direction A in the drawing) of the belt. The cross-sectional shape of the cog portion 1a in the longitudinal direction is substantially semicircular (curved or corrugated), and the cross-sectional shape in the direction orthogonal to the longitudinal direction (width direction or direction B in the drawing) is trapezoidal. That is, each cog portion 1a protrudes in a substantially semicircular shape in the cross section in the A direction from a cog bottom portion 1b in the thickness direction of the belt. The frictional power transmission belt 1 has a laminated structure, and a reinforcing fabric 2, a tension rubber layer 3, an adhesion rubber layer 4, a compression rubber layer 5, and a reinforcing fabric 6 are sequentially laminated from the outer peripheral side of the belt toward the inner peripheral side (side where cog portion 1a is formed). The cross-sectional shape in the width direction of the belt has the trapezoidal shape in which the belt width decreases from the outer peripheral side to the inner peripheral side of the belt. Furthermore, a tension member 4a is buried in the adhesion rubber layer 4, and the cog portion 1a is formed on the compression rubber layer by a mold with a cog.

[Adhesion Rubber Layer]

The adhesion rubber layer (adhesion layer) is provided in contact with at least a portion of the tension member for the purpose of adhering the tension member and a rubber material for forming the belt. In the present invention, the adhesion rubber layer is formed of the vulcanized rubber composition containing a rubber component, short fibers having an average fiber diameter of 2 μm or more, and a filler.

(Rubber Component)

Examples of the rubber component include a known vulcanizable or crosslinkable rubber component and/or elastomer, for example, diene rubbers [natural rubber, isoprene rubber, butadiene rubber, chloroprene rubber, styrene butadiene rubber (SBR), acrylonitrile butadiene rubber (nitrile rubber), hydrogenated nitrile rubber (including a mixed polymer of hydrogenated nitrile rubber and unsaturated carboxylic acid metal salt), etc.], ethylene-α-olefin elastomers, chlorosulfonated polyethylene rubbers, alkylated chlorosulfonated polyethylene rubbers, epichlorohydrin rubbers, acrylic rubbers, silicone rubbers, urethane rubbers, fluorine rubbers, and the like. These rubber components can be used alone or in combination of two or more kinds thereof.

Among these rubber components, ethylene-α-olefin elastomers (ethylene-α-olefin rubbers such as ethylene-propylene copolymer (EPM), and ethylene-propylene-diene terpolymer (EPDM, etc.)) and chloroprene rubber are preferable, and chloroprene rubber is particularly preferable from the viewpoint that a vulcanizing agent and a vulcanization accelerator are easily diffused. The chloroprene rubber may be a sulfur-modified type or a non-sulfur-modified type.

In the case where the rubber component contains chloroprene rubber, the proportion of chloroprene rubber in the rubber component may be approximately 50% by mass or more (particularly 80% to 100% by mass), and is particularly preferably 100% by mass (chloroprene rubber only).

(Short Fibers)

As short fibers, for example, use can be widely made of synthetic fibers such as polyolefin fibers (polyethylene fiber, polypropylene fiber, etc.), polyamide fibers (polyamide 6 fiber, polyamide 66 fiber, polyamide 46 fiber, aramid fiber, etc.), polyalkylene arylate fibers [poly$C_{2-4}$ alkylene$C_{6-14}$ arylate fibers such as polyethylene terephthalate (PET) fiber, polyethylene naphthalate (PEN) fiber, etc.], vinylon fibers, polyvinyl alcohol fibers, and polyparaphenylene benzobisoxazole (PBO) fiber; natural fibers such as cotton, hemp, and wool; and inorganic fibers such as a carbon fiber. These short fibers can be used alone or in combination of two or more kinds thereof. Among these short fibers, the synthetic fibers or natural fibers, particularly the synthetic fibers (polyamide fibers, polyalkylene arylate fibers, etc.), and more particularly the short fibers containing at least the aramid fiber, are preferable from the viewpoint of being rigid, having high strength and modulus, and of easily protruding on the compression rubber layer surface. The aramid short fiber also has high abrasion resistance. The aramid fiber is commercially available, for example, under the trade names "Conex", "Nomex", "Kevlar", "Technora", "Twaron", and the like.

The average fiber diameter of the short fibers is 2 μm or more, for example, 2 to 100 μm, preferably 3 to 50 μm (e.g., 5 to 50 μm), and more preferably approximately 7 to μm (particularly 10 to 30 μm). In the case where the average fiber diameter is too small, there is a possibility that a friction coefficient of the surface may not be sufficiently reduced.

The average length of the short fibers may be, for example, 1 to 20 mm (e.g., 1.2 to 20 mm and preferably 1.5 to 20 mm), preferably 1.3 to 15 mm (e.g., 1.5 to 10 mm), and more preferably approximately 2 to 5 mm (particularly 2.5 to 4 mm). In the case where the average length of the short fibers is too short, there is a possibility that the mechanical characteristic (e.g., modulus, etc.) in the grain direction may not be sufficiently enhanced. On the contrary, in the case of too long, there is a possibility that dispersion failure of the short fibers in the rubber composition may occur, the friction coefficient of the surface may not be sufficiently reduced, and a power transmission efficiency may be decreased.

In order to suppress compression deformation of the belt against pressing from the pulley, the short fibers may be buried in the adhesion rubber layer so as to be oriented in the width direction of the belt.

From the viewpoint of dispersibility and adhesiveness of the short fibers in the rubber composition, the short fibers may be subjected to an adhesion treatment (or surface treatment). It is not necessary that all the short fibers are subjected to an adhesion treatment, and the short fibers subjected to an adhesion treatment and the short fibers not subjected to adhesion treatment (untreated short fibers) may be mixed or used in combination.

The adhesion treatment of the short fibers can be treated with various adhesion treatments, for example, a treatment liquid containing an initial condensate (prepolymer of novolak or resol type phenolic resin) of phenols and formalin, a treatment liquid containing a rubber component (or latex), a treatment liquid containing the initial condensate and a rubber component (latex), and a treatment liquid containing reactive compound (adhesive compound) such as a silane coupling agent, an epoxy compound (epoxy resin, etc.), and an isocyanate compound. In a preferred adhesion treatment, the short fibers are treated with a treatment liquid containing the initial condensate and a rubber component (latex), particularly at least with a resorcinol-formalin-latex (RFL) liquid. Such treatment liquids may be used in combination. For example, the short fibers may be pretreated with a normal adhesive component, for example, a reactive compound (adhesive compound) of an epoxy compound (epoxy resin, etc.) and an isocyanate compound and thereafter, treated with the RFL liquid.

In the case where a treatment with such a treatment liquid, particularly the RFL liquid is performed, the short fibers and the rubber component can be firmly adhered. The RFL liquid is a mixture of an initial condensate of resorcin and formaldehyde and a rubber latex. The molar ratio of resorcin and formaldehyde can be set within a range where the adhesiveness between the rubber component and the short fibers can be improved, for example, the former/latter=approximately 1/0.5 to 1/3, preferably 1/0.6 to 1/2.5, more preferably 1/0.7 to 1/1.5, and may be approximately 1/0.5 to 1/1 (e.g., 1/0.6 to 1/0.8). The kind of the latex is not particularly limited, and can be appropriately selected from the above-mentioned rubber components depending on the kind of the rubber component to be bonded. For example, in the case where the rubber component to be adhered contains chloroprene rubber as a main component, the latex may be a diene rubber (natural rubber, isoprene rubber, butadiene rubber, chloroprene rubber, styrene butadiene rubber (SBR), styrene-butadiene-vinylpyridine terpolymer, acrylonitrile butadiene rubber (nitrile rubber), hydrogenated acrylonitrile butadiene rubber (hydrogenated nitrile rubber), etc.), ethylene-α-olefin elastomer, chlorosulfonated polyethylene rubber, alkylated chlorosulfonated polyethylene rubber, or the like. These latexes may be used alone or in combination of two or more kinds thereof. The preferred latex is a diene rubber (styrene-butadiene-vinylpyridine terpolymer, chloroprene rubber, butadiene rubber, etc.) or a chlorosulfonated polyethylene rubber, and a styrene-butadiene-vinylpyridine terpolymer is preferable for further improving the adhesiveness. In the case where the short fibers are subjected to an adhesion treatment with the treatment liquid (RFL liquid, etc.) containing at least a styrene-butadiene-vinylpyridine terpolymer, the adhesiveness between the rubber composition (chloroprene rubber composition, etc.) and the short fibers can be improved.

The proportion of the initial condensate of resorcin and formalin may be approximately 10 to 100 parts by mass (e.g., 12 to 50 parts by mass and preferably 15 to 30 parts by mass) based on 100 parts by mass of the rubber component of the latex. The total solid content concentration of the RFL liquid can be adjusted within a range of 5% to 40% by mass.

The adhesion rate of the adhesive component (solid content) to the short fibers [(mass after adhesion treatment−mass before adhesion treatment)/(mass after adhesion treatment)×100] is, for example, 1% to 25% by mass, preferably 3% to 20% by mass, and more preferably 5% to 15% by mass, and may be approximately 3% to 10% by mass (particularly 4% to 8% by mass). In the case where the adhesion ratio of the adhesive component is too small, the dispersibility of the short fibers in the rubber composition and the adhesiveness between the short fibers and the rubber composition are insufficient. On the contrary, in the case of too large, there is a possibility that the adhesive component firmly bonds the fiber filaments to each other and the dispersibility is rather decreased.

The method of preparing the short fibers subjected to an adhesive treatment is not particularly limited, and use can be made of, for example, a method in which long fibers of multifilament are impregnated into an adhesive treatment liquid, dried and then, cut into a predetermined length, a method in which untreated short fibers are immersed in an adhesive treatment liquid for a predetermined period of time, and an excess adhesive treatment liquid is removed by a method such as centrifugal separation, followed by drying, and the like.

The proportion of the short fibers is, for example, approximately 0.1 to 15 parts by mass (e.g., 0.5 to 12 parts by mass), preferably 1 to 10 parts by mass, and more preferably 2 to 8 parts by mass (particularly 3 to 7 parts by mass), based on 100 parts by mass of the rubber component. In the case where the proportion of short fibers is too small, there is a possibility that the effect of reducing the friction coefficient of the surface is reduced. On the other hand, in the case of too large, there is a possibility that the adhesive force with the compression rubber layer or the tension rubber layer and the adhesive force with the tension member extremely decreases to cause an interfacial peeling. Furthermore, in the case of too large, since the friction coefficient is too low, the belt slips and the bending fatigue resistance of the adhesion rubber layer decreases (because adhesion rubber layer is hard and bending stress increases), and therefore, in a layout with a small belt winding diameter, there is a possibility that loss (transmission loss) due to bending is large and fuel saving performance is decreased.

(Filler)

In the present invention, a filler preferably contains silica in viewpoint of increasing the adhesiveness of the adhesion rubber layer and improving the durability of the belt. Silica is a fine, bulky white powder formed of silicic acid and/or silicate, and can chemically bond with the rubber component since a plurality of silanol groups are present on the surface thereof.

Silica includes dry silica, wet silica, surface treated silica, and the like. In addition, silica can be classified into, for example, a dry type white carbon, a wet type white carbon, a colloidal silica, a precipitated silica, and the like, according to a classification of a preparing method. These silica can be used alone or in combination of two or more kinds thereof. Among these, the wet type white carbon mainly containing hydrous silicic acid is preferable from the viewpoint of many surface silanol groups and strong chemical bonding force with rubber.

The average particle diameter of the silica is, for example, approximately 1 to 1,000 nm, preferably 3 to 300 nm, and more preferably approximately 5 to 100 nm (particularly 10 to 50 nm). In the case where the particle diameter of the silica is too large, there is a possibility that the mechanical properties of the adhesion rubber layer is decreased, and in the case of too small, there is a possibility that it is difficult to disperse uniformly.

In addition, the silica may be either non-porous or porous, but has a nitrogen adsorption specific surface area by the BET method of, for example, approximately 50 to 400 $m^2/g$, preferably 70 to 350 $m^2/g$, and more preferably 100 to 300 $m^2/g$ (particularly, 150 to 250 $m^2/g$). In the case where the specific surface area is too large, there is a possibility that it is difficult to disperse uniformly, and in the case where the specific surface area is too small, there is a possibility that the mechanical properties of the adhesion rubber layer is decreased.

In order to remarkably improve fatigue fracture resistance and abrasion resistance, the filler may contain carbon black in addition to the silica. The average particle diameter of carbon black is, for example, approximately 5 to 200 nm, preferably 10 to 150 nm and more preferably 15 to 100 nm. From the viewpoint of high reinforcing effect, carbon black may have a small particle diameter, for example, approximately 5 to 38 nm, preferably 10 to 35 nm, and more preferably 15 to 30 nm. Examples of carbon black having a small particle diameter include SAF, ISAF-HM, ISAF-LM, HAF-LS, HAF, and HAF-HS. These carbon blacks can be used alone or in combination.

The proportion of carbon black may be 300 parts by mass or less (particularly 200 parts by mass or less) based on 100 parts by mass of silica, and may be, for example, approximately 150 parts by mass or less (e.g., 10 to 150 parts by mass), preferably 100 parts by mass or less (e.g., 15 to 100 parts by mass), more preferably 80 parts by mass or less (e.g., 20 to 80 parts by mass), and particularly 60 parts by mass or less (e.g., 30 to 60 parts by mass). In the case where the proportion of silica is too small, there is a possibility that the adhesion of the adhesion rubber layer is decreased. The proportion of silica is preferably set larger than the proportion of carbon black.

The filler may further contain a normal filler. Examples of the normal fillers include clay, calcium carbonate, talc, mica, and the like. These fillers can be used alone or in combination of two or more kinds thereof.

The proportion of silica may be 40% by mass or more, preferably 50% by mass or more, and more preferably 60% by mass or more (particularly 80% by mass or more), based on the whole filler. In the case where the proportion of silica is too small, there is a possibility that the adhesiveness of the adhesion rubber layer is decreased, the adhesive force with the compression rubber layer or the tension rubber layer and the adhesive force with the tension member are extremely decreased, and interfacial peeling occurs.

The proportion (total proportion) of the filler is, for example, approximately from 30 to 100 parts by mass, preferably 40 to 80 parts by mass, and more preferably 50 to 70 parts by mass (particularly 55 to 65 parts by mass), based on 100 parts by mass of the rubber component. In the case where the proportion of the filler is too small, there is a possibility that the abrasion resistance decreases due to a decrease in the elastic modulus. On the contrary, in the case of too large, there is a possibility that the elastic modulus is too high and heat generation increases, so that cracks occur in the tension rubber layer and the compression rubber layer at an early stage.

(Additive)

If necessary, the rubber composition for forming the adhesion rubber layer may contain a vulcanizing agent or crosslinking agent (or crosslinking agent series), a co-crosslinking agent, a vulcanization aid, a vulcanization accelerator, a vulcanization retardant, metal oxide (e.g., zinc oxide, magnesium oxide, calcium oxide, barium oxide, iron oxide, copper oxide, titanium oxide, aluminum oxide, etc.), a softening agent (oils such as paraffin oil, naphthene oil, etc.), a processing agent or processing aid (a fatty acid such as stearic acid, a fatty acid metal salt such as metal stearate, a fatty acid amide such as stearic acid amide, wax, paraffin, etc.), an adhesion improver [resorcinol-formaldehyde cocondensates, amino resins (a condensate of a nitrogen-containing cyclic compound and formaldehyde, for example, a melamine resin such as hexamethylol melamine, hexaalkoxymethyl melamine (hexamethoxymethyl melamine, hexabutoxymethyl melamine, etc.), a urea resin such as methylol urea, a benzoguanamine resin such as methylol benzoguanamine resin, etc.), cocondensates thereof (resorcinol-melamine-formaldehyde co-condensate, etc.), etc.], an antioxidant (antioxidant, heat aging inhibitor, flex crack preventive, ozone deterioration inhibitor, etc.), a colorant, a tackifier, a plasticizer, a coupling agent (a silane coupling agent, etc.), a stabilizer (an ultraviolet absorber, a heat stabilizer, etc.), a flame retardant, an antistatic agent, and the like. The metal oxide may act as a crosslinking agent. In addition, in the adhesion improver, the resorcin-formaldehyde cocondensate and the amino resin may be an initial condensate (prepolymer) of resorcin and/or a nitrogen-containing cyclic compound such as melamine with formaldehyde.

As the vulcanizing agent or crosslinking agent, normal components can be used depending on the type of the rubber component, and examples thereof include the above-mentioned metal oxides (magnesium oxide, zinc oxide, etc.), organic peroxides (diacyl peroxide, peroxyester, dialkyl peroxide, etc.), a sulfur vulcanizing agent, and the like. Examples of the sulfur vulcanizing agent include powdered sulfur, precipitated sulfur, colloidal sulfur, insoluble sulfur, highly dispersible sulfur, sulfur chloride (sulfur monochloride, sulfur dichloride, etc.), and the like. These crosslinking agents or vulcanizing agents may be used alone or in combination of two or more kinds thereof. In the case where the rubber component is chloroprene rubber, the metal oxide (magnesium oxide, zinc oxide, etc.) may be used as the vulcanizing agent or crosslinking agent. The metal oxide may be used in combination with another vulcanizing agent (sulfur vulcanizing agent, etc.), and the metal oxide and/or the sulfur vulcanizing agent may be used alone or in combination with the vulcanization accelerator.

The proportion of the vulcanizing agent can be selected from the range of approximately 1 to 20 parts by mass based on 100 parts by mass of the rubber component depending on the kind of the vulcanizing agent and the rubber component. For example, the proportion of the organic peroxide as the vulcanizing agent can be selected from the range of approximately 1 to 8 parts by mass, preferably 1.5 to 5 parts by mass, and more preferably 2 to 4.5 parts by mass, based on 100 parts by mass of the rubber component. The proportion of the metal oxide can be selected from the range of approximately 1 to 20 parts by mass, preferably 3 to 17 parts by mass, and more preferably 5 to 15 parts by mass (particularly 7 to 13 parts by mass), based on 100 parts by mass of the rubber component.

Examples of the co-crosslinking agent (crosslinking aid or co-vulcanizing agent co-agent) include known crosslinking aids such as multifunctional (iso)cyanurates [e.g., triallyl isocyanurate (TAIL) and triallyl cyanurate TAC), etc.], polydienes (e.g., 1,2-polybutadiene, etc.), metal salts of unsaturated carboxylic acids [e.g., zinc (meth)acrylate, magnesium (meth)acrylate, etc.], oximes (e.g., quinone dioxime, etc.), guanidines (e.g., diphenylguanidine, etc.), polyfunctional (meth)acrylates [e.g., ethylene glycol di(meth)acrylate, butanediol di(meth)acrylate, trimethylolpropane tri(meth) acrylate, etc.], bismaleimides (aliphatic bismaleimide such as N, N'-1,2-ethylene bismaleimide, 1,6'-bismaleimide-(2,2,4-trimethyl)cyclohexane; arene bismaleimide or aromatic bismaleimide such as N—N'-m-phenylene bismaleimide, 4-methyl-1,3-phenylebismaleimide, 4,4'-diphenylmethane bismaleimide, 2,2-bis[4-(4-maleimidophenoxy)phenyl]propane, 4,4'-diphenyl ether bismaleimide, 4,4'-diphenylsulfone bismaleimide, 1,3-bis(3-maleimidophenoxy) benzene, etc.), and the like. These crosslinking aids can be used alone or in combination of two or more kinds thereof. Of these crosslinking aids, bismaleimides (arene bismaleimide such as N,N'-m-phenylenedimaleimide or aromatic bismaleimide) are preferred. The addition of a bismaleimide can increase the degree of crosslinking and prevent adhesion abrasion and the like.

The proportion of the co-crosslinking agent (crosslinking aid) can be selected from the range of approximately 0.01 to 10 parts by mass based on 100 parts by mass of the rubber component, in terms of solid content, and for example, may be approximately 0.1 to parts by mass (e.g., 0 3 to 4 parts by mass), and preferably 0.5 to 3 parts by mass (e.g., 0.5 to 2 parts by mass).

Examples of the vulcanization accelerator include thiuram accelerators [e.g., tetramethylthiuram monosulfide (TMTM), tetramethylthiuram disulfide (TMTD), tetraethylthiuram disulfide (TETD), tetrabutylthiuram disulfide (TBTD), dipentamethylenethiuram tetrasulfide (DPTT), N,N'-dimethyl-N,N'-diphenylthiuram disulfide, etc.], thiazole accelerators [e.g., 2-mercaptobenzothiazole, a zinc salt of 2-mercaptobenzothiazole, 2-mercaptothiazoline, dibenzothiazyl disulfide, 2-(4'-morpholinodithio)benzothiazole, etc.), etc.], sulfenamide accelerators [e.g., N-cyclohexyl-2-benzothiazyl sulfenamide (CBS), N,N'-dicyclohexyl-2-benzothiazyl sulfenamide, etc.], bismaleimide accelerators (e.g., N,N'-m-phenylene bismaleimide, N,N'-1,2-ethylene bismaleimide, etc.), guanidines (e.g., diphenylguanidine, di-o-tolylguanidine, etc.), urea or thiourea accelerators (e.g., ethylene thiourea, etc.), dithiocarbamic acid salts, xanthogenates, and the like. These vulcanization accelerators can be used alone or in combination of two or more kinds thereof. Of these vulcanization accelerators, TMTD, DPTT, CBS and the like are widely used.

The proportion of the vulcanization accelerator may be, for example, approximately 0.1 to 15 parts by mass, preferably 0.3 to 10 parts by mass, and more preferably 0.5 to 5 parts by mass, based on 100 parts by mass of the rubber component, in terms of solid content.

The proportion of the softening agent (oils such as naphthene oil) may be, for example, approximately 1 to 30 parts by mass, and preferably 3 to 20 parts by mass (e.g., 5 to 10 parts by mass), based on 100 parts by mass of the total amount of the rubber component. In addition, the proportion of the processing agent or processing aid (stearic acid, etc.) may be approximately 10 parts by mass or less (e.g., 0 to 10 parts by mass), preferably 0.1 to 5 parts by mass, and more preferably 0.3 to 3 parts by mass (particularly 0.5 to 2 parts by mass), based on 100 parts by mass of the rubber component.

The proportion of the adhesion improver (resorcinol-formaldehyde cocondensate, hexamethoxymethyl melamine, etc.) may be approximately 0.1 to 20 parts by mass, preferably 0.3 to 10 parts by mass, and more preferably 0.5 to 5 parts by mass (1 to 3 parts by mass), based on 100 parts by mass of the rubber component.

The proportion of the antioxidant may be, for example, approximately 0.5 to 15 parts by mass, preferably 1 to 10 parts by mass, and more preferably 2.5 to 7.5 parts by mass (particularly 3 to 7 parts by mass), based on 100 parts by mass of the total amount of the rubber component.

(Properties of Adhesion Rubber Layer)

The mechanical characteristic of the adhesion rubber layer can be appropriately selected according to the required performance. For example, in accordance with JIS K6253 (2012), the rubber hardness is, for example, approximately 75° to 90°, preferably 80° to 88°, and more preferably 82° to 86°. Furthermore, the adhesion rubber layer having a high rubber hardness may be formed. For example, by blending a large amount of the filler, the rubber hardness may be adjusted to approximately 84° to 90°.

The adhesion rubber layer may be formed of a vulcanized rubber composition having a ratio (compression stress/bending stress ratio) of compression stress to bending stress being 0.5 or more. The compression stress/bending stress ratio is, for example, approximately 0.5 to 0.9, preferably 0.55 to 0.85, and more preferably 0.6 to 0.8 (particularly 0.65 to 0.8). In the case where the compression stress/bending stress ratio is too small, there is a possibility that the power transmission efficiency and durability of the belt decrease.

The thickness of the adhesion rubber layer can be appropriately selected according to the type of the belt, and may be, for example, approximately 0.4 to 3.0 mm, preferably 0.6 to 2.2 mm, and more preferably 0.8 to 1.4 mm.

[Tension Member]

Although the tension member is not particularly limited, generally, cords (twisted cords) disposed at predetermined intervals in the width direction of the belt can be used. The cords are disposed to extend in the longitudinal direction of the belt and are normally disposed to extend in parallel at a predetermined pitch parallel to the longitudinal direction of the belt. The cord only has to be in contact with the adhesion rubber layer at a part thereof, and any of a form in which the adhesion rubber layer buries the cord, a form in which the cord is buried between the adhesion rubber layer and the tension rubber layer, and a form in which the cord is buried between the adhesion rubber layer and the compression rubber layer may be employed. Among them, from the viewpoint of improving the durability, the form in which the adhesion rubber layer buries the cord is preferred.

As the fibers constituting the cord, the same fibers as that of the short fibers can be exemplified. Among the above fibers, from the viewpoint of high modulus, use can be widely made of polyester fibers (polyalkylene arylate fibers) having $C_{2-4}$ alkylene arylate such as ethylene terephthalate and ethylene-2,6-naphthalate as a main constituent unit, synthetic fibers such as an aramid fiber, inorganic fibers such as a carbon fiber, and the like, and the polyester fibers (polyethylene terephthalate fibers and polyethylene naphthalate fibers) and the polyamide fibers are preferred. The fibers may be multifilament yarns. The fineness of the multifilament yarns may be, for example, approximately 2,000 to 10,000 denier (particularly 4,000 to 8,000 denier). The multifilament yarns may contain, for example, approximately 100 to 5,000, preferably 500 to 4,000, and more preferably 1,000 to 3,000 monofilament yarns.

As the cord, normally, twisted cords (e.g., plied twists, single twists, Lang's twists, etc.) using multifilament yarns can be used. The average core diameter of the cord (fiber diameter of the twisted cord) may be, for example, approximately 0.5 to 3 mm, preferably 0.6 to 2 mm, and more preferably 0.7 to 1.5 mm.

The cord may be subjected to an adhesion treatment (or surface treatment) in the same manner as in the short fibers in order to improve the adhesiveness to the rubber component. The cord is preferably subjected to the adhesion treatment with at least RFL liquid.

[Compression Rubber Layer and Tension Rubber Layer]

Similar to the vulcanizable rubber composition for the adhesion rubber layer, the vulcanizable rubber composition for forming the compression rubber layer (inner rubber layer or inner layer) and the tension rubber layer (outer rubber layer or outer layer) may contain a rubber component (chloroprene rubber, etc.), a vulcanizing agent or crosslinking agent (metal oxides such as magnesium oxide and zinc oxide and sulfur vulcanizing agents such as sulfur, etc.), a co-crosslinking agent or crosslinking aid (maleimide crosslinking agents such as N,N'-m-phenylenedimaleimide, etc.), a vulcanization accelerator (TMTD, DPTT, CBS, etc.), a filler (carbon black, silica, etc.), a softening agent (oils such as naphthene oil, etc.), a processing agent or processing aid (stearic acid, metal stearate, wax, paraffin, etc.), an antioxidant, an adhesion improver, a filler (clay, calcium carbonate, talc, mica, etc.), a colorant, a tackifier, a plasticizer, a coupling agent (a silane coupling agent, etc.), a stabilizer (an ultraviolet absorber, a heat stabilizer, etc.), a flame retardant, an antistatic agent, and the like.

Furthermore, the vulcanizable rubber composition for forming the compression rubber layer and the tension rubber layer may contain short fibers. Examples of the short fibers include the same fibers as the short fibers mixed in the adhesion rubber layer. Among the above fibers, the synthetic fibers or natural fibers, particularly the synthetic fibers (polyamide fibers, polyalkylene arylate fibers, etc.), and more particularly the short fibers containing at least the aramid fiber, are preferable from the viewpoint of being rigid and having high strength and modulus. The average fiber diameter and average length of the short fibers can be selected from the same range as in the short fibers of the adhesion rubber layer, and an adhesion treatment (or surface treatment) may be performed in the same manner as in the adhesion rubber layer. Furthermore, in the compression rubber layer and tension rubber layer, the short fibers may be made protrude from the surface by grinding the surface (frictional power transmission surface). The average protruding height of the short fibers may be approximately 50 µm or more (e.g., 50 to 200 µm).

In this rubber composition, as the rubber component, rubber of the same type (diene rubbers, etc.) or the same kind (chloroprene rubber, etc.) as the rubber component of the rubber composition of the adhesion rubber layer is used in many cases.

The proportions of the vulcanizing agent or crosslinking agent, the co-crosslinking agent or crosslinking aid, the vulcanization accelerator, the softening agent, the processing agent or processing aid, and the antioxidant can be selected from the same range as those of the rubber composition of the adhesion rubber layer, respectively. In addition, the proportion of short fibers can be selected from the range of approximately 5 to 50 parts by mass based on 100 parts by mass of the rubber component, and normally, may be approximately 10 to 40 parts by mass, preferably 15 to 35 parts by mass, and more preferably 20 to 30 parts by mass. Furthermore, the proportion of the filler is approximately 1 to 100 parts by mass, preferably 3 to 50 parts by mass, and more preferably 5 to 40 parts by mass, based on 100 parts by mass of the rubber component.

The average thickness of the compression rubber layer can be appropriately selected according to the type of the belt, and is, for example, approximately 2 to 25 mm, preferably 3 to 16 mm, and more preferably 4 to 12 mm. The thickness of the tension rubber layer can be appropriately selected according to the type of the belt, and is, for example, approximately 0.8 to 10.0 mm, preferably 1.2 to 6.5 mm, and more preferably 1.6 to 5.2 mm

[Reinforcing Fabric]

In the case of using a reinforcing fabric in the frictional power transmission belt, it is not limited to a form of laminating the reinforcing fabric on the surface of the compression rubber layer. For example, a reinforcing fabric may be laminated on the surface of the tension rubber layer (surface opposite to the adhesion rubber layer), or a reinforcing layer may be buried in the compression rubber layer and/or the tension rubber layer (e.g., a form described in JP-A-2010-230146, etc.). The reinforcing fabric can be formed of, for example, a fabric material (preferably a woven fabric) such as a woven fabric, a wide angle canvas, a knitted fabric, an unwoven fabric. If necessary, the reinforcing fabric may be laminated on the surface of the compression rubber layer and/or the tension rubber layer after the above-described adhesion treatment, for example, a treatment (immersion treatment, etc.) with an RFL liquid, a friction for rubbing an adhesive rubber into the fabric material, or laminating (coating) the adhesive rubber and the fabric material.

[Method for Manufacturing Frictional Power Transmission Belt]

A method for manufacturing the frictional power transmission belt of the present invention is not particularly limited, and a conventional method can be used for a laminating step (method of manufacturing a belt sleeve) of each layer.

For example, in the case of a cogged V-belt, a laminated body including a reinforcing fabric (lower fabric) and a compression rubber layer sheet (unvulcanized rubber) may be installed on a flat cogged mold in which tooth portions and groove portions are alternately disposed, with the reinforcing fabric downward, and pressed at a temperature of approximately 60° C. to 100° C. (particularly 70° C. to 80° C.) to prepare a cog pad having a cog portion molded (pad which is not completely vulcanized and is in a semi-vulcanized state), and thereafter, both ends of the cog pad may be cut perpendicularly from a top portion of a cog ridge portion. Then, a cylindrical mold may be covered with an inner mother die in which tooth portions and groove portions are alternately disposed, the cog pad may be wound to engage with the tooth portions and the groove portions and jointed at the top portion of the cog ridge portion, and a first adhesion rubber layer sheet (lower adhesive rubber: unvulcanized rubber) may be laminated on the wound cog pad. Thereafter, a cord serving as a tension member may be spun into spiral shape, and a second adhesion rubber layer sheet (upper adhesive rubber: the same as the first adhesion rubber layer sheet), a tension rubber layer sheet (unvulcanized rubber), and a reinforcing fabric (upper fabric) may be sequentially wound thereon to prepare a molded body. Thereafter, the mold may be covered by a jacket, installed in a vulcanizing can, and vulcanized at a temperature of approximately 120° C. to 200° C. (particularly 150° C. to 180° C.) to prepare a belt sleeve, and then, the belt sleeve may be cut into a V-shape by using a cutter or the like.

[Power Transmission Efficiency]

When the frictional power transmission belt provided with the adhesion rubber layer of the present invention is used, the power transmission efficiency can be significantly improved. The power transmission efficiency is an index that the belt transmits a rotational torque from a drive pulley to a driven pulley, and means that the higher the power transmission efficiency, the smaller the power transmission loss of the belt and the better fuel saving performance. In a biaxial layout in which the belt 11 is hung on two pulleys of a drive pulley (Dr.) 12 and a driven pulley (Dn.) 13 illustrated in FIG. 4, a power transmission efficiency can be obtained as follows.

Figure 4:
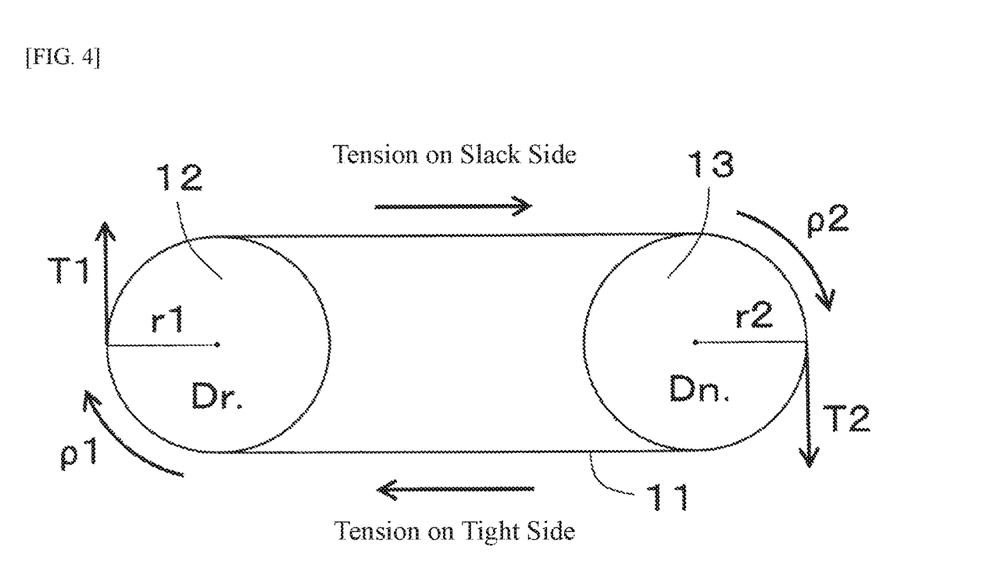
FIG. 4 is a schematic view for explaining a method of measuring power transmission efficiency.

When a rotation speed of the drive pulley is $\rho_1$ and its pulley radius is $r_1$, the rotational torque $T_1$ of the drive pulley can be represented as $\rho_1 \times T_e \times r_1$. $T_e$ is an effective tension obtained by subtracting a tension on a slack side (tension on a side where the belt runs toward the driven pulley) from a tension on a tight side (tension on a side where the belt runs toward the drive pulley). Similarly, when a rotation speed of the driven pulley is $\rho_2$ and its pulley radius is $r_2$, a rotational torque $T_2$ of the driven pulley is represented as $\rho_2 \times T_e \times r_2$. The power transmission efficiency $T_2/T_1$ is calculated by dividing the rotational torque $T_2$ of the driven pulley by the rotational torque $T_1$ of the drive pulley and can be represented by a following equation.

$$T_2/T_1 = (\rho_2 \times T_e \times r_2)/(\rho_1 \times T_e \times r_1) = (\rho_2 \times r_2)/(\rho_1 \times r_1)$$

The value of the power transmission efficiency is 1 when there is no power transmission loss, and when there is some power transmission loss, the value decreases by that loss. That is, it means that the closer to 1, the smaller the power transmission loss of the belt and the better fuel saving performance.

EXAMPLE

Hereinafter, the present invention will be described in more detail based on Examples, but the present invention is not limited to these Examples. In the following Examples, the raw materials used in Examples, the measurement methods or the evaluation methods for each physical property are explained below. Unless otherwise specified, "parts" and "%" are on a mass basis.

[Raw Material]

Chloroprene rubber: "R22" manufactured by Tosoh Corporation

Aramid short fiber: "Conex Short Fiber" manufactured by Teijin Techno Products Co., Ltd., average fiber length of 3 mm, average fiber diameter of 14 μm, and short fibers having been subjected to an adhesion treatment with RFL liquid (2.6 parts of resorcinol, 1.4 parts of 37% formalin, 17.2 parts of vinyl pyridine-styrene-butadiene copolymer latex (manufactured by Zeon Corporation), 78.8 parts of water), and having an adhesion rate of 6% by mass of solid matter Carbon black: "Seast 3" manufactured by Tokai Carbon Co., Ltd.

Silica: "Ultrasil VN-3" manufactured by Evonik Degussa Japan Ltd., specific surface area of 155 to 195 m$^2$/g Naphthene oil: "NS-900" manufactured by Idemitsu Kosan Co., Ltd.

Resorcin-formalin copolymer (resorcinol resin): Resorcinol-formalin copolymer having less than 20% of resorcinol and less than 0.1% of formalin Antioxidant: "Nonflex OD3" manufactured by Seiko Chemical Industry Co., Ltd.

Vulcanization accelerator TMTD: tetramethylthiuram disulfide

Cord: Fibers obtained through an adhesion treatment of cord having a total denier of 6,000 obtained by subjecting 1,000 denier PET fibers to plied twist in a 2×3 twist configuration with a first twist coefficient of 3.0 and a second twist coefficient of 3.0.

[Measurement of Physical Properties of Vulcanized Rubber]

(1) Hardness

An adhesion rubber layer sheet was press vulcanized at a temperature of 160° C. for 30 minutes to prepare a vulcanized rubber sheet (100 mm×100 mm×2 mm thickness). According to JIS K6253 (2012), the hardness was measured by using a laminate obtained by laminating three sheets of vulcanized rubber sheets as a sample and the hardness was measured by using a durometer type A hardness tester.

(2) Abrasion Amount

A vulcanized rubber sheet (50 mm×50 mm×8 mm thickness) prepared by press vulcanizing an adhesion rubber layer sheet at a temperature of 160° C. for 30 minutes, was cut out with a hollow drill having an inner diameter of 16.2±0.05 mm to prepare a cylindrical sample having a diameter of 16.2±0.2 mm and a thickness of 6 to 8 mm. According to JIS K6264 (2005), the abrasion loss of the vulcanized rubber was measured by using a rotating cylindrical drum device (DIN abrasion tester) around which an abrasive cloth was wound.

(3) Compression Stress

An adhesion rubber layer sheet was press vulcanized at a temperature of 160° C. for 30 minutes to prepare a vulcanized rubber molded body (length 25 mm, width 25 mm, thickness 12.5 mm). The short fibers were made to orient in a direction perpendicular to a compression surface (thickness direction). The vulcanized rubber molded body was interposed vertically between two metal compression plates (in an interposed state where the vulcanized molded body was not pressed by the compression plate, the position of the upper compression plate was taken as the initial position) and the upper compression plate was pressed against the vulcanized rubber molded body (pressure surface 25 mm×25 mm) at a rate of 10 mm/min to distort the vulcanized rubber molded body by 20%. After holding for 1 second in this state, the compression plate was returned upward to the initial position (preliminary compression). After repeating this preliminary compression three times, a stress when the strain in the thickness direction of the vulcanized rubber molded body reached 4% was measured as a compression stress, from a stress-strain curve measured in the fourth compression test (conditions was the same as preliminary compression). The preliminary compression was performed three times to reduce variance in measured data.

(4) Bending Stress

Figure 5:
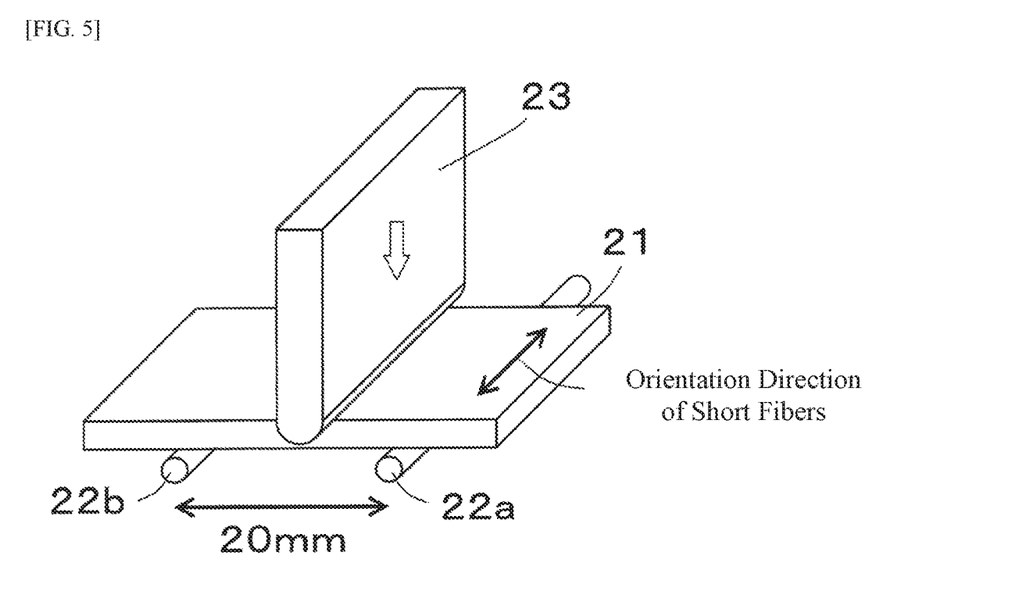
FIG. 5 is a schematic view for explaining a method of measuring a bending stress in Example.

An adhesion rubber layer sheet was press vulcanized at a temperature of 160° C. for 30 minutes to prepare a vulcanized rubber molded body (60 mm×25 mm×6.5 mm thickness). The short fibers were made to orient in a direction parallel to the width (short side direction) of the vulcanized rubber molded body. As illustrated in FIG. 5, this vulcanized rubber molded body 21 was placed on a pair of rotatable rolls 22a and 22b (diameter of 6 mm) at intervals of 20 mm and supported, and a metal pressing member 23 was placed in the width direction (orientation direction of short fibers) at the center of the upper surface of the vulcanized rubber molded body. The tip end portion of the pressing member 23 has a semicircular shape with a diameter of 10 mm, and by the tip end portion thereof, the vulcanized rubber molded body 21 can be pressed smoothly. In addition, at the time of pressing, although a frictional force acts between the lower surface of the vulcanized rubber molded body 21 and the rolls 22a and 22b as the vulcanized rubber molded body 21 is compressed and deformed, by making the rolls 22a and 22b rotatable, the influence due to friction is reduced. A state where the tip end portion of the pressing member 23 contacted the upper surface of the vulcanized rubber molded body 21 and was not pressed was taken as an initial position, and the upper surface of the vulcanized rubber molded body 21 was pressed downward at the speed of 100 mm/min by the pressing member 23 from this state, and a stress when a bending strain reached 8% was measured as a bending stress.

Furthermore, the ratio (compression/bending ratio) of the measured compression stress to the measured bending stress was calculated. Here, the compression stress and bending stress can be used as indices that influence the power transmission efficiency and durability, and the larger the compression stress is and the smaller the bending stress is, the more the power transmission efficiency and durability tend to be improved. That is, a large compression/bending ratio works in a direction where the power transmission efficiency and durability are improved, and conversely a small compression/bending ratio works in a direction where the power transmission efficiency and durability are decreased.

(5) Peeling Force

A plurality of cords were disposed in parallel so that the width was 25 mm on one side of an unvulcanized adhesion rubber layer sheet having a thickness of 4 mm, and canvas was laminated on the other side, and this laminated body (cord, adhesion rubber layer sheet, and canvas) was subjected to press vulcanization (temperature of 160° C., time of 30 min, pressure of 2.0 MPa) to prepare a strip sample (25 mm×150 mm×4 mm thickness) for a peeling test. In accordance with JIS K6256 (2013), the peeling test was performed at a tensile rate of 50 mm/min, and the peeling force (vulcanizing adhesive force) between the cord and the adhesion rubber layer sheet was measured under a room temperature atmosphere (23° C.).

[Measurement of Physical Properties of Belt]

(1) Measurement of Friction Coefficient

Figure 6:
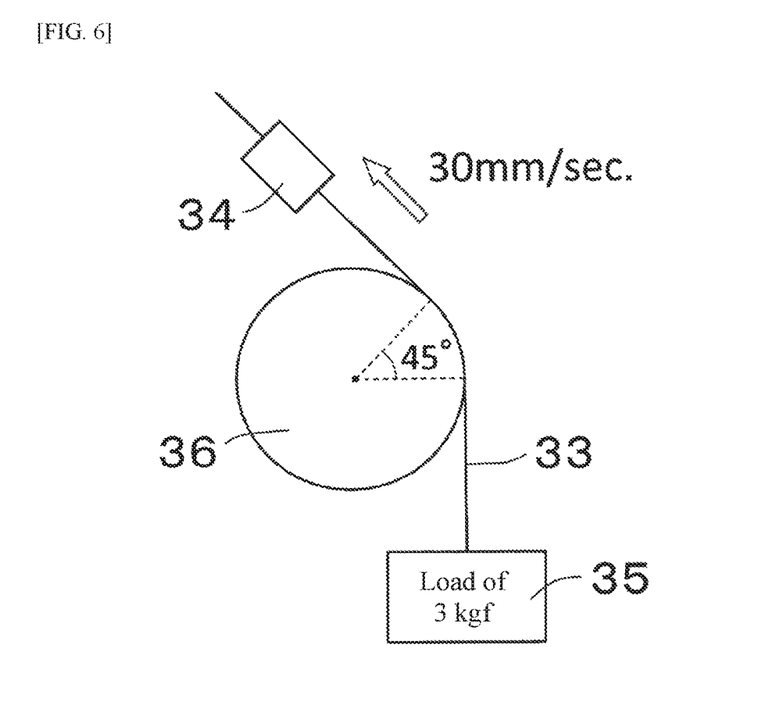
FIG. 6 is a schematic view for explaining a method of measuring a friction coefficient in Example.

As illustrated in FIG. 6, for a friction coefficient of the belt, one end of the cut belt 33 was fixed to a load cell 34, a load 35 of 3 kgf was placed on the other end thereof, and the belt 33 was wound around the pulley 36 so that the winding angle of the belt to the pulley 36 was set to be 45°. The belt 33 on the load cell 34 side was pulled at a speed of 30 mm/sec for approximately 15 seconds, and the average friction coefficient of the frictional power transmission surface was measured. Upon measurement, the pulley 36 was fixed so as not to rotate.

(2) High-Speed Running Test (Power Transmission Efficiency)

In this running test, a power transmission efficiency of the belt was evaluated when running in a state where the belt was made slide on the pulley outward in the radial direction of the pulley. Specifically, when the rotation speed of the drive pulley increases, a centrifugal force strongly acts on the belt. In addition, at the position of the slack side of the drive pulley (refer to FIG. 7), the belt tension acts low, and due to the combined action with the centrifugal force, the belt attempts to jump outward in the radial direction of the pulley at this position. In the case where this jumping out is not smoothly performed, that is, the frictional force strongly acts between the frictional power transmission surface of the belt and the pulley, a power transmission loss of the belt is generated by the frictional force, and the power transmission efficiency decreases.

Figure 7:
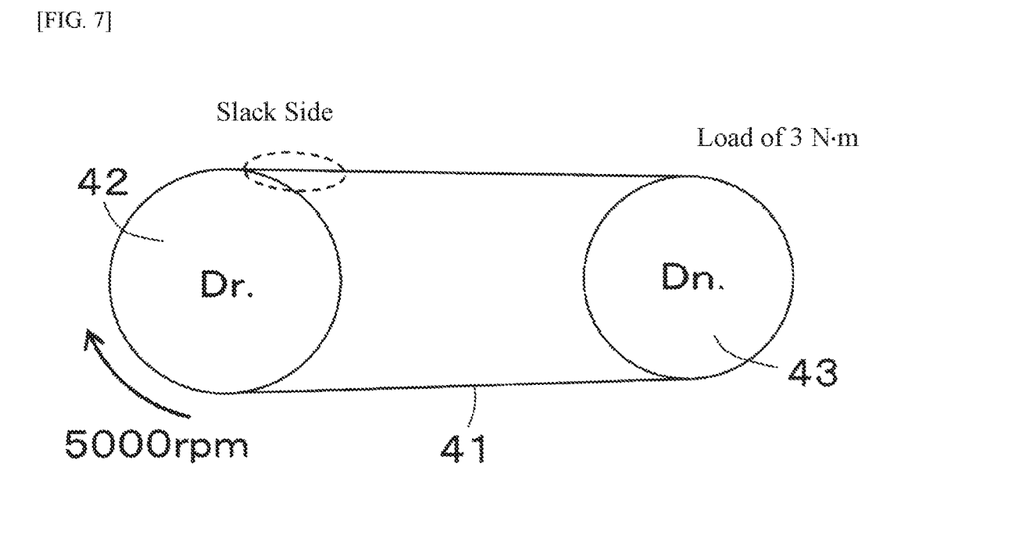
FIG. 7 is a schematic view for explaining a high-speed running test in Example.

As illustrated in FIG. 7, a high-speed running test was performed by using a biaxial running tester including a drive (Dr.) pulley 42 having a diameter of 95 mm and a driven (Dn.) pulley 43 having a diameter of 85 mm. A raw-edge cogged V-belt 41 was hung on each of the pulleys 42 and 43, a load of 3 N·m was applied to the driven pulley 43, and the belt 41 was run under a room temperature atmosphere (23° C.) at a rotation speed of 5,000 rpm of the drive pulley 42. The surface temperature of the belt reached a maximum of 60° C. during running. Immediately after running, the rotation speed of the driven pulley 43 was read from a detector, and the power transmission efficiency was obtained from the above-mentioned calculation formula. In Table 3, the power transmission efficiency for each Example and Comparative Example was represented in relative value converted by taking the power transmission efficiency of Comparative Example 1 as "1". In the case where the value is larger than 1, it is judged that the power transmission efficiency, that is, fuel saving performance of the belt 41 is high.

(3) Durability Running Test (Lateral Pressure Resistance)

Figure 8:
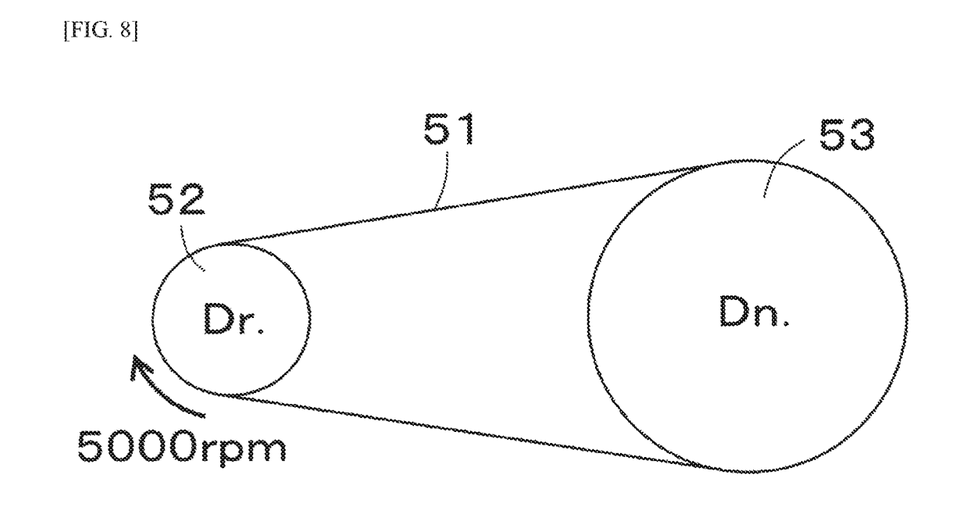
FIG. 8 is a schematic view for explaining a durability running test in Example.

As illustrated in FIG. 8, a durability running test was performed by using a biaxial running tester including a drive (Dr.) pulley 52 having a diameter of 50 mm and a driven (Dn.) Pulley 53 having a diameter of 125 mm. The raw-edge cogged V-belt 51 was hung on each of the pulleys 52 and 53, a load of 10 N·m was applied to the driven pulley 53, and the belt 51 was run at an atmospheric temperature of 80° C. for a maximum of 60 hours at a rotation speed of 5,000 rpm of the drive pulley 52. When the belt 51 ran for 60 hours, it was judged that there was no problem in durability. In addition, the side surface of the belt (surface in contact with the pulley) after running was observed with a microscope, and the presence or absence of peeling between the rubber layers and peeling of the cord was investigated. For the peeled portion, the peeling depth was measured with a microscope. In addition, a weight of the belt before running and a weight of the belt after running were measured with an electronic balance and the weight difference was calculated as the abrasion amount of the belt in durability running.

Examples 1 to 14 and Comparative Examples 1 to 4

(Formation of Rubber Layer)

Each of the rubber compositions of Table 1 (adhesion rubber layer) and Table 2 (compression rubber layer and tension rubber layer) was subjected to rubber kneading by using a known method such as a Banbury mixer and the kneaded rubber was passed through a calender roll to prepare a rolled rubber sheet (adhesion rubber layer sheet, compression rubber layer sheet, and tension rubber layer sheet).

both ends of the cog pad were cut perpendicularly from a top portion of a cog ridge portion.

A cylindrical mold was covered with an inner mother die in which tooth portions and groove portions were alternately disposed, the cog pad was wound to engage with the tooth

TABLE 1

(adhesion rubber layer)

| | Example (parts) | | | | | | | | | | | | | | Comp. Ex. (parts) | | | |
|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 1 | 2 | 3 | 4 |
| Chloroprene rubber | 100 | 100 | 100 | 100 | 100 | 100 | 100 | 100 | 100 | 100 | 100 | 100 | 100 | 100 | 100 | 100 | 100 | 100 |
| Aramid short fiber | 0.5 | 1 | 5 | 10 | 11 | 5 | 5 | 5 | 5 | 5 | 5 | 5 | 5 | 5 | — | — | — | — |
| Carbon black | 20 | 20 | 20 | 20 | 20 | 40 | 30 | 10 | 0 | 0 | 10 | 10 | 10 | 10 | 20 | 60 | 0 | 40 |
| Silica | 40 | 40 | 40 | 40 | 40 | 20 | 30 | 50 | 60 | 70 | 30 | 40 | 60 | 70 | 40 | 0 | 60 | 20 |
| Naphthene oil | 5 | 5 | 5 | 5 | 5 | 5 | 5 | 5 | 5 | 5 | 5 | 5 | 5 | 5 | 5 | 5 | 5 | 5 |
| Magnesium oxide | 4 | 4 | 4 | 4 | 4 | 4 | 4 | 4 | 4 | 4 | 4 | 4 | 4 | 4 | 4 | 4 | 4 | 4 |
| Resorcin-formalin copolymer | 1 | 1 | 1 | 1 | 1 | 1 | 1 | 1 | 1 | 1 | 1 | 1 | 1 | 1 | 1 | 1 | 1 | 1 |
| Antioxidant | 4 | 4 | 4 | 4 | 4 | 4 | 4 | 4 | 4 | 4 | 4 | 4 | 4 | 4 | 4 | 4 | 4 | 4 |
| Zinc oxide | 5 | 5 | 5 | 5 | 5 | 5 | 5 | 5 | 5 | 5 | 5 | 5 | 5 | 5 | 5 | 5 | 5 | 5 |
| Vulcanization accelerator TMTD | 1 | 1 | 1 | 1 | 1 | 1 | 1 | 1 | 1 | 1 | 1 | 1 | 1 | 1 | 1 | 1 | 1 | 1 |
| N,N'-m-phenylene-dimaleimide | 2 | 2 | 2 | 2 | 2 | 2 | 2 | 2 | 2 | 2 | 2 | 2 | 2 | 2 | 2 | 2 | 2 | 2 |
| Stearic acid | 2 | 2 | 2 | 2 | 2 | 2 | 2 | 2 | 2 | 2 | 2 | 2 | 2 | 2 | 2 | 2 | 2 | 2 |
| Hexamethoxy-methylol melamine | 3 | 3 | 3 | 3 | 3 | 3 | 3 | 3 | 3 | 3 | 3 | 3 | 3 | 3 | 3 | 3 | 3 | 3 |

TABLE 2

(compression rubber layer and tension rubber layer) Composition (parts)

| | |
|---|---|
| Chloroprene rubber | 100 |
| Aramid short fiber | 20 |
| Naphthene oil | 5 |
| Magnesium oxide | 4 |
| Carbon black | 30 |
| Antioxidant | 4 |
| Zinc oxide | 5 |
| N,N'-m-phenylenedimaleimide | 4 |
| Stearic acid | 2 |
| Vulcanization accelerator TMTD | 1 |
| Sulfur | 0.5 |

(Manufacture of Belt)

A laminated body of a reinforcing fabric and a compression rubber layer sheet (unvulcanized rubber) was installed on a flat cogged mold in which tooth portions and groove portions were alternately disposed, with the reinforcing fabric downward, and pressed at 75° C. to prepare a cog pad having a cog portion molded (which was not completely vulcanized, and was in a semi-vulcanized state). Thereafter, portions and the groove portions and jointed at the top portion of the cog ridge portion. An adhesion rubber layer sheet (lower adhesive rubber: unvulcanized rubber) was laminated on the wound cog pad. Thereafter, a cord was spun into spiral shape, and another adhesion rubber layer sheet (upper adhesive rubber: the same as the above adhesion rubber layer sheet), a tension rubber layer sheet (unvulcanized rubber), and an upper fabric were sequentially wound thereon to prepare a molded body. Thereafter, the mold was covered by a jacket, installed in a vulcanizing can, and vulcanized at a temperature of 160° C. and for 20 minutes to obtain a belt sleeve. The belt sleeve was cut into a V-shaped cross section with a predetermined width in the longitudinal direction of the belt with a cutter and finished to a raw-edge cogged V-belt (size: upper width of 22.0 mm, thickness of 11.0 mm, and outer peripheral length of 800 mm) which was a belt having the structure illustrated in FIG. 2, that is, a variable speed belt having a cog on the inner peripheral side of the belt.

The evaluation results of the belts obtained in Examples and Comparative Examples are shown in Table 3.

TABLE 3

| | Example | | | | | | | | | |
|---|---|---|---|---|---|---|---|---|---|---|
| | 1 | 2 | 3 | 4 | 5 | 6 | 7 | 8 | 9 | 10 |
| (Physical properties of vulcanized rubber) | | | | | | | | | | |
| Hardness (°) | 82 | 83 | 84 | 85 | 85 | 83 | 83 | 85 | 86 | 87 |
| Abrasion amount (mg) | 165 | 160 | 140 | 120 | 119 | 130 | 135 | 150 | 160 | 155 |
| Compression stress (MPa) | 0.77 | 0.81 | 0.91 | 1.05 | 1.06 | 0.84 | 0.87 | 0.97 | 1.04 | 1.10 |
| Bending stress (MPa) | 1.31 | 1.32 | 1.50 | 1.65 | 1.69 | 1.58 | 1.54 | 1.45 | 1.31 | 1.49 |
| Compression/bending ratio | 0.59 | 0.61 | 0.61 | 0.64 | 0.63 | 0.53 | 0.56 | 0.67 | 0.79 | 0.74 |
| Peeling force (N/25 mm) | 290 | 285 | 255 | 220 | 210 | 205 | 235 | 270 | 325 | 295 |

TABLE 3-continued

| (Physical properties of belt) | | | | | | | | | | |
|---|---|---|---|---|---|---|---|---|---|---|
| Friction coefficient | | 1.29 | 1.26 | 1.11 | 1.05 | 1.03 | 1.07 | 1.09 | 1.15 | 1.18 | 1.15 |
| Power transmission efficiency | | 1.01 | 1.01 | 1.03 | 1.05 | 1.05 | 1.03 | 1.04 | 1.02 | 1.02 | 1.02 |
| High load durability running | Durability (hr) | 60 | 60 | 60 | 60 | 60 | 60 | 60 | 60 | 60 | 60 |
| | Peeling between Rubber layers | Nil | Nil | Nil | Nil | Depth 0.5 mm | Depth 1.0 mm | Nil | Nil | Nil | Nil |
| | Cord peeling | Nil | Nil | Nil | Nil | Length 10 mm | Length 10 mm | Nil | Nil | Nil | Nil |
| Abrasion amount (g) | | 4.2 | 4.1 | 3.8 | 3.5 | 3.4 | 3.5 | 3.7 | 3.9 | 4.0 | 3.9 |

| | | Example | | | | Comparative Example | | | |
|---|---|---|---|---|---|---|---|---|---|
| | | 11 | 12 | 13 | 14 | 1 | 2 | 3 | 4 |
| (Physical properties of vulcanized rubber) | | | | | | | | | |
| Hardness (°) | | 79 | 81 | 87 | 88 | 82 | 80 | 83 | 81 |
| Abrasion amount (mg) | | 175 | 160 | 145 | 140 | 175 | 155 | 185 | 170 |
| Compression stress (MPa) | | 0.75 | 0.85 | 1.06 | 1.13 | 0.78 | 0.70 | 0.82 | 0.72 |
| Bending stress (MPa) | | 1.30 | 1.38 | 1.54 | 1.72 | 1.30 | 1.75 | 1.12 | 1.65 |
| Compression/bending ratio | | 0.58 | 0.62 | 0.69 | 0.66 | 0.60 | 0.40 | 0.73 | 0.53 |
| Peeling force (N/25 mm) | | 280 | 295 | 260 | 215 | 295 | 140 | 350 | 195 |
| (Physical properties of belt) | | | | | | | | | |
| Friction coefficient | | 1.26 | 1.18 | 1.15 | 1.15 | 1.33 | 1.25 | 1.36 | 1.30 |
| Power transmission efficiency | | 1.01 | 1.02 | 1.02 | 1.02 | 1.00 | 1.00 | 1.00 | 1.00 |
| High load durability running | Durability (hr) | 60 | 60 | 60 | 60 | 60 | 60 | 60 | 60 |
| | Peeling between Rubber layers | Depth 1.0 mm | Nil | Nil | Depth 1.0 mm | Nil | Depth 2.0 mm | Nil | Nil |
| | Cord peeling | Nil | Nil | Nil | Length 10 mm | Nil | Length 40 mm | Nil | Nil |
| Abrasion amount (g) | | 4.1 | 3.8 | 3.8 | 4.3 | 4.3 | 3.9 | 4.4 | 4.2 |

As was clear from the results shown in Table 3, in the power transmission belt (Examples 1 to 9 and Comparative Examples 1 to 4) having the total amount of the filler (silica and carbon black) of the adhesion rubber layer being 60 parts by mass, when comparing the difference due to the presence or absence of aramid short fibers, in Examples 2 to 4 and 7 to 9 containing 1 to 10 parts by mass of aramid short fibers in the adhesion rubber layer, the friction coefficient of the adhesion rubber layer was reduced, the difference with the friction coefficient of the compression rubber layer (or tension rubber layer) was small, and the power transmission efficiency was improved while maintaining the durability equivalent to or higher than that of Comparative Example 1 which did not contain aramid short fibers.

Although the adhesion rubber layer of Example 6 contained 60 parts by mass of the total amount of filler and contained the aramid short fibers, since the proportion of carbon black was larger than that of silica, there was no problem in friction coefficient, but adhesiveness was slightly insufficient, the interfacial peeling from the cord and the interlayer peeling from the compression rubber layer (or tension rubber layer) was likely to occur as compared with Examples 2 to 4, and the durability slightly decreased.

Although the adhesion rubber layer of Example 1 contained 60 parts by mass of the total amount of the filler and contained the aramid short fibers, since the amount of the aramid short fibers was small (0.5 parts by mass), the reduction of the friction coefficient was slightly insufficient and the durability was good, but improvement in the power transmission efficiency was not observed as much as in Examples 2 to 4.

Although the adhesion rubber layer of Example 5 contained 60 parts by mass of the total amount of filler and contained the aramid short fibers, since the amount of aramid short fibers was large (11 parts by mass), the friction coefficient was significantly reduced and the power transmission efficiency was good, the adhesiveness (peeling force) was slightly insufficient, and the interfacial peeling from the cord and the interlayer peeling from the compression rubber layer (or tension rubber layer) was likely to occur as compared with Examples 2 to 4, and the durability decreased.

On the other hand, Examples 10 to 14 were examples in which the total amount of the filler (silica and carbon black) was changed to a value other than 60 parts by mass. Example 11 having 40 parts by mass of the total amount of filler had a slightly low mechanical characteristic and lacked lateral pressure resistance, so that it was likely to deform (buckle) in a durability running, slight peeling occurred between layers with the compression rubber layer (or tension rubber layer), and the durability was decreased as compared with Examples 2 to 4. In Example 14 having 80 parts by mass of the total amount of the filler, whereas it was rigid and hard to deform (buckle), it was hard to bend, and stress was concentrated on the interface, so that interfacial peeling from the cord and interlayer peeling from the compression rubber layer (or tension surface rubber layer) was likely to occur and the durability decreased, as compared with Examples 2 to 4. In Examples 10, 12 and 13, the same performance as Examples 2 to 4 was obtained.

On the other hand, Comparative Examples 1 to 4 were an adhesion rubber layer in which the total amount of filler (silica and carbon black) was 60 parts by mass. Since the adhesion rubber layer of Comparative Example 1 did not contain the short fibers, the friction coefficient was high and the durability was good, but the power transmission efficiency was low.

Comparative Example 2 is an example in which the adhesion rubber layer did not contain the short fibers and the filler was only carbon black (did not contain silica). Due to the high proportion of carbon black, the bending stress was large and the bending fatigue resistance was lacked, and since there was no silica, the adhesiveness (peeling force) was lacked, the friction coefficient was high, and slidability was lacked. Due to these influences, in durability running, the interfacial peeling from the cord and the interlayer peeling from the compression rubber layer (or tension rubber layer) significantly occurred and the durability was low.

Comparative Example 3 is an example in which the adhesion rubber layer did not contain the short fibers, and the filler was only silica (did not contain carbon black). Since silica with high adhesiveness was contained, peeling force (adhesion) was high and the interfacial peeling from the cord or the interlayer peeling from the compression rubber layer (or tension rubber layer) did not occur, but the abrasion amount of the belt was large and the abrasion resistance was low. In addition, the friction coefficient was high and the power transmission efficiency was low.

Here, the relationship between compression/bending ratio and durability and power transmission efficiency is considered. In Comparative Example 2 in which the compression/bending ratio was 0.40, in Example 6 in which the ratio was 0.53, and in Example 11 in which the ratio was 0.58, in the durability running test, rubber layer peeling or cord peeling occurred, and the durability was low. In addition, in Comparative Example 1 in which the compression/bending ratio was 0.60, in Comparative Example 4 in which the ratio was 0.53, and in Example 1 in which the ratio was 0.59, the friction coefficient was high and the power transmission efficiency was low. In cases where the compression/bending ratio exceeds approximately 0.60, both the durability and the power transmission efficiency were achieved.

Although the present invention has been described in detail and with reference to specific embodiments, it will be apparent to those skilled in the art that various modifications and variations can be made without departing from the spirit and scope of the present invention.

This application is based on Japanese Patent Application No. 2015-249033 filed on Dec. 21, 2015 and Japanese Patent Application No. 2016-240727 filed on Dec. 12, 2016, the contents of which are incorporated herein by reference.

INDUSTRIAL APPLICABILITY

The frictional power transmission belt of the present invention can be applied to, for example, a V-belt (wrapped V-belt, raw-edge V-belt, and raw-edge cogged V-belt), a V-ribbed belt, a flat belt, or the like. Specifically, it is preferably applied to a V-belt (variable speed belt) used in a transmission (continuously variable transmission device) in which the gear ratio varies steplessly while the belt is running, for example, a raw-edge cogged V-belt and a raw-edge double cogged V-belt used for a continuously variable transmission device of a motorcycle, an ATV (4 wheel buggy), a snowmobile, and the like.

REFERENCE SIGNS LIST

1 Frictional power transmission belt
2, 6 Reinforcing fabric
3 Tension rubber layer
4 Adhesion rubber layer
4a Tension member
5 Compression rubber layer

The invention claimed is:

1. A frictional power transmission belt comprising:
   a tension member extending in a longitudinal direction of a belt, and
   an adhesion rubber layer in contact with at least a portion of the tension member,
   wherein the adhesion rubber layer is formed of a vulcanized rubber composition comprising:
      a rubber component,
      short fibers having an average fiber diameter of 2 µm or more, and
      a filler comprising silica and carbon black,
      wherein a proportion of the carbon black is 15 to 100 parts by mass based on 100 parts by mass of the silica,
      wherein a proportion of the filler is 50 to 70 parts by mass based on 100 parts by mass of the rubber component,
      wherein a proportion of the short fibers is 0.5 to 10 parts by mass based on 100 parts by mass of the rubber component,
      wherein the short fibers comprise an aramid fiber,
      wherein the short fibers are buried in the adhesion rubber layer so as to be oriented in a width direction of the belt, and
      wherein the frictional power transmission belt is a raw-edge cogged V-belt.

2. The frictional power transmission belt according to claim 1, wherein the rubber component comprises chloroprene rubber.

3. The frictional power transmission belt according to claim 1, wherein the average fiber diameter of the short fibers is 5 to 50 µm.

4. The frictional power transmission belt according to claim 1, wherein the short fibers have an average fiber length of 1.5 to 20 mm.

5. The frictional power transmission belt according to claim 1, wherein the adhesion rubber layer is formed of the vulcanized rubber composition having a ratio (compression stress/bending stress ratio) of compression stress to bending stress being 0.6 to 0.8.

6. The frictional power transmission belt according to claim 1, being a variable speed belt used in a continuously variable transmission device.

* * * * *